United States Patent
Spilman (10) Patent No.: US 8,417,501 B2
(45) Date of Patent: Apr. 9, 2013

(54) CONFIGURING A SIMULATOR FOR TESTING WIRELESS DEVICES

(75) Inventor: Jeremy Spilman, Natick, MA (US)

(73) Assignee: Azimuth Systems, Inc., Acton, MA (US)

( * ) Notice: Subject to any disclaimer, the term of this patent is extended or adjusted under 35 U.S.C. 154(b) by 871 days.

(21) Appl. No.: 12/505,634

(22) Filed: Jul. 20, 2009

(65) Prior Publication Data

US 2011/0015915 A1 Jan. 20, 2011

(51) Int. Cl.
*G06F 17/50* (2006.01)
*G06G 7/62* (2006.01)

(52) U.S. Cl. .......................... 703/13; 370/326

(58) Field of Classification Search .............. 703/6, 13; 370/236

See application file for complete search history.

(56) References Cited

U.S. PATENT DOCUMENTS

| | | | | |
|---|---|---|---|---|
| 7,349,670 B2 * | 3/2008 | Mlinarsky et al. | ......... | 455/67.11 |
| 7,693,082 B2 * | 4/2010 | Wright | ........... | 370/246 |
| 7,890,821 B2 * | 2/2011 | Music et al. | ................. | 714/715 |
| 2006/0019679 A1 * | 1/2006 | Rappaport et al. | ......... | 455/456.5 |

OTHER PUBLICATIONS

SR5500 "SR5500 Wireless Channel Emulator User Manual". Spirent Communications. 2008. 218 Pages.*

* cited by examiner

*Primary Examiner* — Eunhee Kim
(74) *Attorney, Agent, or Firm* — Anderson Gorecki & Rouille LLP (57) ABSTRACT

A simulator for testing a wireless device is configured by using an indication of connected devices and channel model to be applied to an identified link received as input to calculate settings for function elements which modify signals to implement simulated effects defined by the channel model. The calculations are performed while a test is running, thereby avoiding delays associated with playback tests. Allocation of simulator paths and function elements are automated, and an indication of how the wireless devices are to be connected to the simulator is provided to the user.

22 Claims, 7 Drawing Sheets

| Link Table | | | | | | |
|---|---|---|---|---|---|---|
| Enabled ▼ | Device A | Device B | Model Forward | Min Path Loss | Velocity | Prop. Delay |
| ⊟ Enabled Links | | | | | | |
| ☑ | BS1 | MS1 | Butler | 86.75 | N/A | 0 |
| ☑ | BS1 | MS2 | Butler | 86.75 | N/A | 0 |

Link table list 500

*Figure 5* channel model selection window 600

CONFIGURING A SIMULATOR FOR TESTING WIRELESS DEVICES

FIELD OF THE INVENTION

This invention is generally related to test equipment, and more particularly to facilitating configuration of test equipment for evaluating wireless devices.

BACKGROUND OF THE INVENTION

Cellular networks and Wireless Local Area Networks ("WLANs") enable communications between mobile wireless devices such as mobile phones and portable computers and fixed location wireless devices such as access points and base stations. It is naturally desirable to test the performance of such devices under different conditions. However, testing wireless devices in an open environment is notoriously difficult because wireless communications can be affected by ambient sources of interference. It is now relatively common to use simulators to perform wireless device testing in a closed environment. One type of simulator includes a separate container for each wireless device to shield against external electromagnetic interference (EMI). Communications are converted from wireless radio frequency (RF) to wired signals, and the containers are placed in communication via wired connections. A simulator connected between the containers subjects the communications to simulated physical environmental effects. In particular, a user enters detailed data indicative of effects on each path at various points in time to define a test. Alternatively, the complex calculations required to configure a simulator are performed by a computer during a preparation phase and the results are used to generate a "playback" test. Such simulators certainly provide some advantages over open air testing. However, configuring a simulator for a network of even modest complexity is difficult and time consuming because the number of pathways increases significantly as a function of the number of devices in the test. This presents a problem for both physical wiring between devices and calculations for programming emulation modules. For example, simulators that require detailed manual data entry may become impractical when scaled up due to the volume of data that must be entered. Similarly, the preparation phase for playback test simulators increases, and the lack of ability to quickly implement changes results in inefficiency.

SUMMARY OF THE INVENTION

According to one embodiment of the invention, a method for testing a wireless device in a network environment including multiple wireless devices comprises: receiving as input an indication of devices to be connected to a simulator for test, where the simulator connects a first device to a second device via a link that includes multiple paths, and each path includes at least one function element for modifying a signal on the path with which the function element is associated; receiving as input an indication of at least one channel model to be applied to an identified link; calculating allocation of simulator paths based on the received indication of devices to be connected to the simulator; calculating a setting for each function element while a test is running, the setting being calculated based on the at least one channel model; configuring the simulator paths according to the calculated allocation; configuring each function element with the setting calculated for that function element; and modifying a signal transmitted from a first wireless device to a second wireless device with ones of the function elements.

According to another embodiment of the invention, apparatus for testing a wireless device in a network environment including multiple wireless devices comprises: an interface for receiving as input: an indication of devices to be connected to a simulator for test, where the simulator connects a first device to a second device via a link that includes multiple paths, and each path includes at least one function element for modifying a signal on the path with which the function element is associated; and an indication of at least one channel model to be applied to an identified link; a processor for: calculating allocation of simulator paths based on the received indication of devices to be connected to the simulator; calculating a setting for each function element while a test is running, the setting being calculated based on the at least one channel model; configuring the simulator paths according to the calculated allocation; configuring each function element with the setting calculated for that function element; and modifying a signal transmitted from a first wireless device to a second wireless device with ones of the function elements.

Advantages associated with the invention include ease of use and scalability. Unlike some prior art simulators which require user input for each path at various points in time, or offline calculations to produce a pre-recorded test, the disclosed simulator performs calculations for the user in real-time during a test. In particular, the simulator calculates configuration settings for each function element while a test is being run. This helps to avoid the need for tedious manual calculation and entry of configuration data, and the delays associated with playback tests.

In another embodiment of the invention the interface includes a supermodel view which allows the user to select different channel models for application to a single link at different periods of time. For example, a first channel model could be used for the link for the first half of a test, and a second channel model could be used for the link for the second half of the test. The supermodel view also allows the user to select a transition function and transition duration. Supermodels facilitate simulation of macro-environmental changes. Individual channel models are appropriate for simulating the effects of individual environments, e.g., relative motion at walking speed or driving speed. In order to simulate macro-environmental changes, e.g., a wireless device moving at a walking speed for a mile, and then moving at driving speed with traffic effects while moving from an urban area to a suburban area, it is helpful to have the capability to transition between multiple environments. A simulation of a device moving at driving speed through a tunnel could involve three or more environment transitions to reflect the major changes that occur. The window allows the user to select the different environments, the order in which they occur, the duration of each in time, and the duration and other characteristics of transition between environments.

Other features and advantages of embodiments of the invention will be apparent from the figures and detailed description.

DETAILED DESCRIPTION

Figure 1:
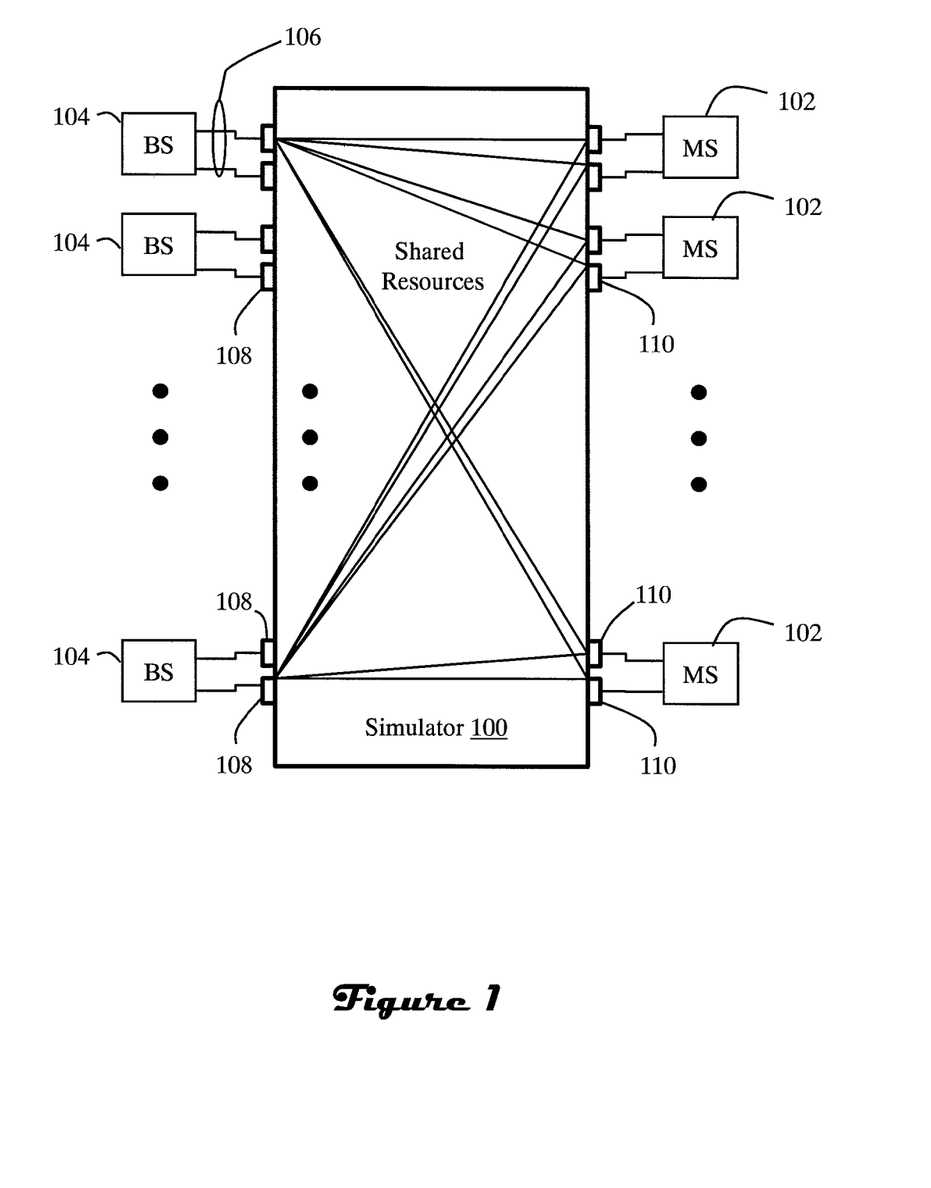
FIG. 1 is a block diagram of a wireless network simulator.

FIG. 1 illustrates a wireless environment simulator 100. The simulator is operable to interconnect a set of two or more wireless devices in order to simulate effects on communications between the devices by using various shared resources. The wireless devices may include, without limitation, mobile stations 102 such as wireless phones and portable computers, and base stations 104 such as access points and cellular base stations. The wireless devices are disposed in first and second housings, respectively, which provide shielding from external electromagnetic interference (EMI). External cabling 106 is employed by the user in place of the antennas to connect the wireless devices to ports on the simulator. In the illustrated example, each port 108 is associated with a particular antenna port of the base station 104 to which it is connected by a cable, and each port 110 is associated with a particular antenna port of the mobile station 102 to which it is connected by a cable. The signals transmitted between devices are selectively modified by the simulator in order to simulate effects such as multipath reflections, delay spread, angle of arrival, power angular spread, angle of departure, antenna spacing, uniform linear array for both TX and RX side, Doppler due to fluorescent light effects, Doppler from moving vehicle, Doppler from changing environments, path loss, shadow fading effects, reflections in clusters and external interference such as radar signals, microwave oven emissions, phone transmission and other wireless signals or noise.

Figure 2:
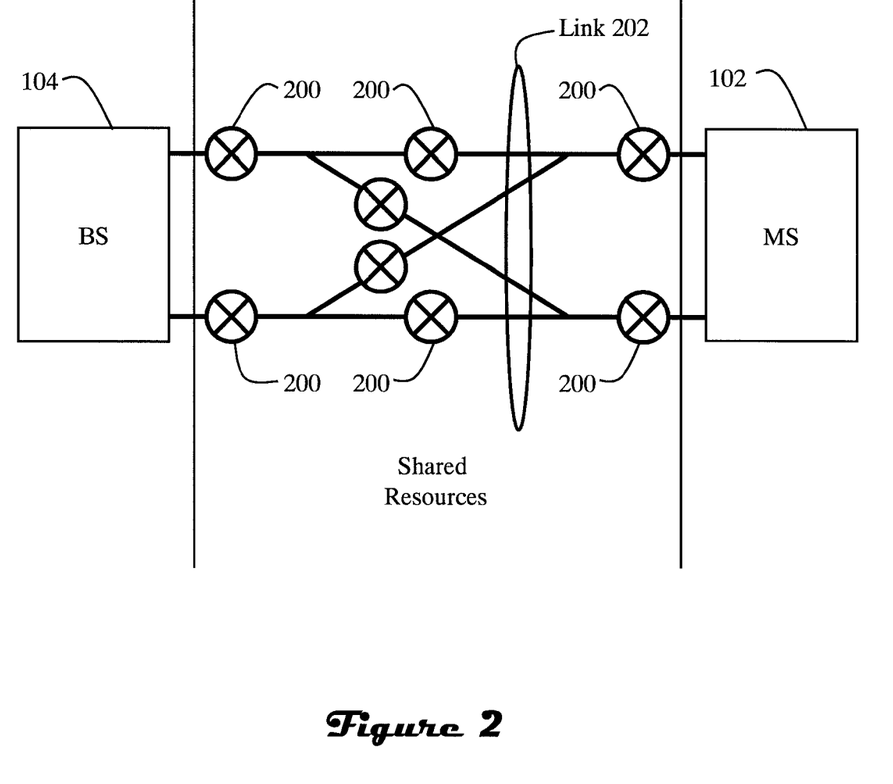
FIG. 2 is a block diagram of hardware function elements of the simulator of FIG. 1 that are used to support a link between devices.

Referring to FIGS. 1 and 2, the shared resources of simulator 100 include hardware function elements 200 and wired RF interconnection paths between those function elements. The function elements 200 operate to modify the signals in the various paths associated with each logical link in order to simulate the effects described above. In the case of a test including two devices, each having two antennas, the link 202 between the two devices utilizes four logical paths. It should be noted that the mapping between logical paths and physical paths will depend on factors such as whether the logical paths are unidirectional or bidirectional. At least one hardware function element 200 is disposed in each path in order to simulate the effects on communications between the devices. The illustrated example includes three function elements in each path. Although the particular number and position of the function elements is an implementation detail, a greater number of function elements distributed between various path junctions can improve adaptability and scalability. Each function element includes digital signal processing circuitry which emulates the effects of a physical environment, e.g., air and interference, on signals in a transmission channel. For example, a function element increases or decreases attenuation or gain to emulate path-loss or fading resulting from movement and changing environmental artifacts.

In view of the above it will be apparent that configuring the simulator 100 to test wireless devices requires careful attention to allocation of the shared resources and the cabling via which the devices are connected to the simulator. For example, the individual function elements, which may be shared by multiple paths and links, must be controlled in a manner which achieves a desired effect. It will also be appreciated that errors in either cabling or function element control will degrade the value of test results. The present invention includes a simulator configuration interface that facilitates these tasks. The interface and underlying computations may be implemented wholly or partly by a computer program stored on a computer-readable medium which, when executed, performs the steps and renders the views described below.

Figure 3:
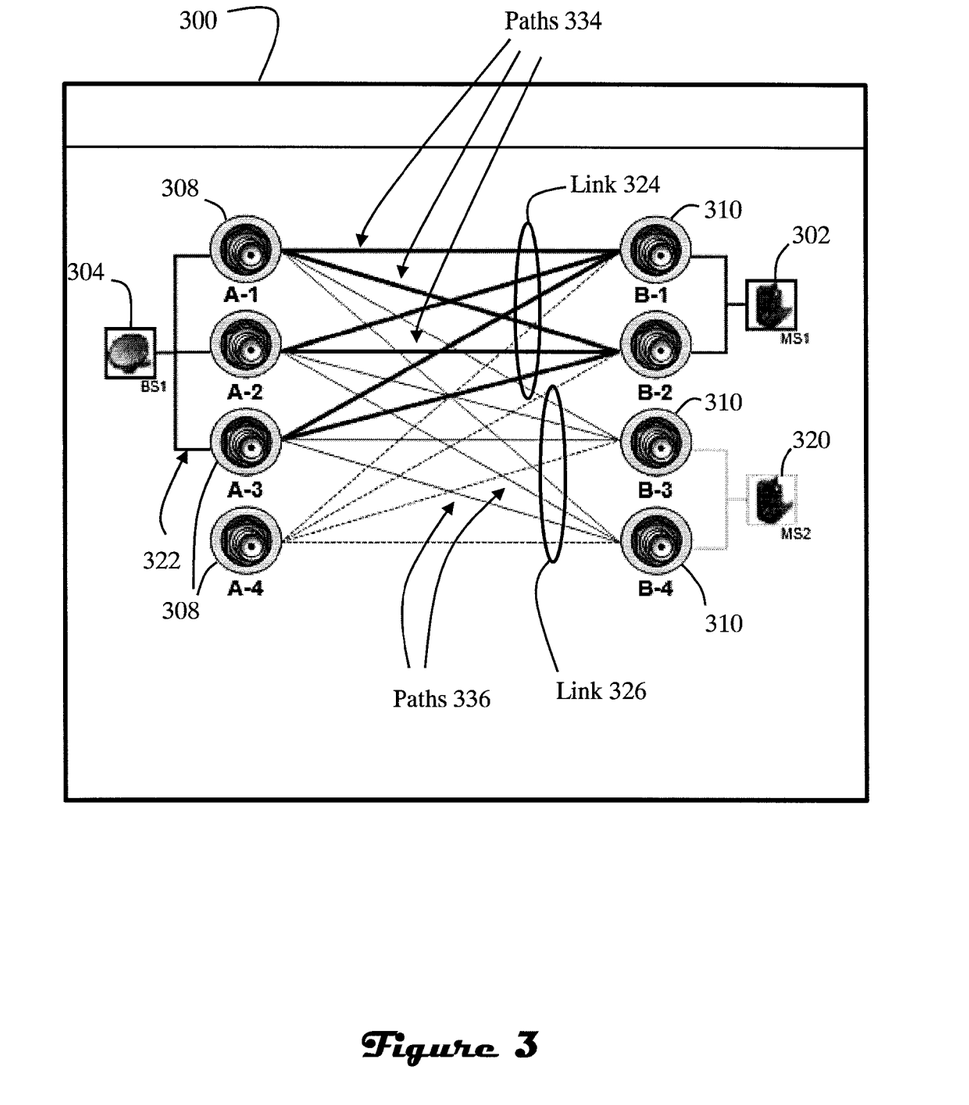
FIG. 3 is an interface window including a logical representation of connection topology, including links and paths between devices.

Referring to FIG. 3, a user interface window 300 including a logical view of connection topology is provided to facilitate configuration of the simulator for performing a test. Devices 102, 104 (FIGS. 1 and 2) involved in the test are represented with icons 302, 304 and distinctive labels, e.g., BS1, MS1. Other devices may also be shown, e.g., device MS2 using icon 320. Simulator ports 108, 110 (FIGS. 1 and 2) are also represented with icons 308, 310 and distinctive labels, e.g., A-1, A-2, A-3, A-4, B-1, B-2, B-3, B-4. Separate lines 322 corresponding to each device antenna represent individual connections to particular simulator ports. Further, the interface window renders lines which represent a selected link 324 associated with selected paths 334 between icons 302, 304. Also rendered are lines which represent non-selected link 326 associated with non-selected paths 336 (not all of which are labeled in FIG. 3) between icons 320, 304.

Because a logical representation is often the easiest for a user to understand, the logical view window may be employed by the user to indicate which wireless devices are to be included in a test, and which of those wireless devices are in communication with one another. For example, the logical view interface window may initially present the user with a view of the port icons of each simulator module available for the test. The user would then edit the configuration by selecting from icons representing wireless devices involved in the test. The user would then manipulate the icons to specify a number of antennas for each device, and identify the links between wireless devices. The interface then performs functions to facilitate simulator configuration of shared resources as described below.

Figure 4A:
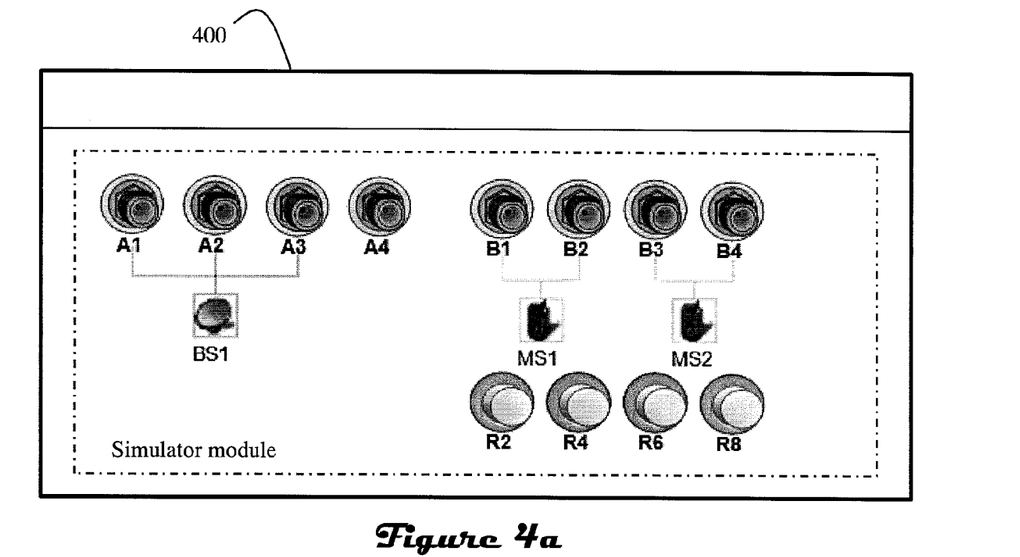
FIGS. 4a and 4b are interface windows that illustrate physical wiring between devices for one simulator chassis and two simulator chassis tests, respectively.
Figure 4B:
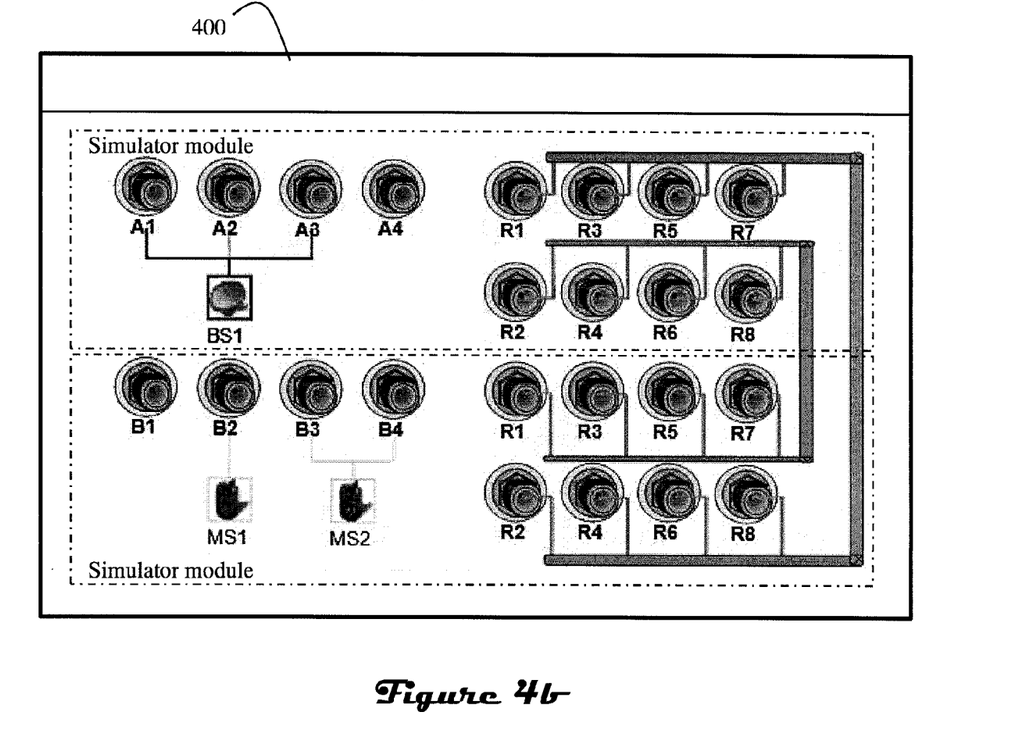

Referring to FIGS. 3, 4a and 4b, the interface is operable to use the information entered by the user to automatically render another window 400 that illustrates physical cabling corresponding to the logical view. Again, it should be noted that the mapping between logical paths and physical paths will depend on factors such as whether the logical paths are unidirectional or bidirectional. More particularly, the user chooses whether the logical link is unidirectional or bidirectional, which impacts the mapping, resource allocation, cabling and physical view representation of cabling. The physical view can be employed by the user to help perform the task of properly cabling the devices to the simulator. It should be noted that the distinctive port labels may be changed, e.g., dynamically assigned on a per-test basis. For example, the ports on the simulator chassis may have small LED or LCD screens for displaying labels corresponding to the logical and physical views for a given test, as opposed to fixed painted-on labels. The capability of easily changing port labeling on the simulator chassis facilitates scaling. For example, when scaling from use of a single simulator module (as in FIG. 4a) to two simulator modules (as in FIG. 4b), the labels on the different simulator modules can be made distinctive. Consequently, the test bed can be more easily scaled-up by adding new simulator modules.

Figure 5:
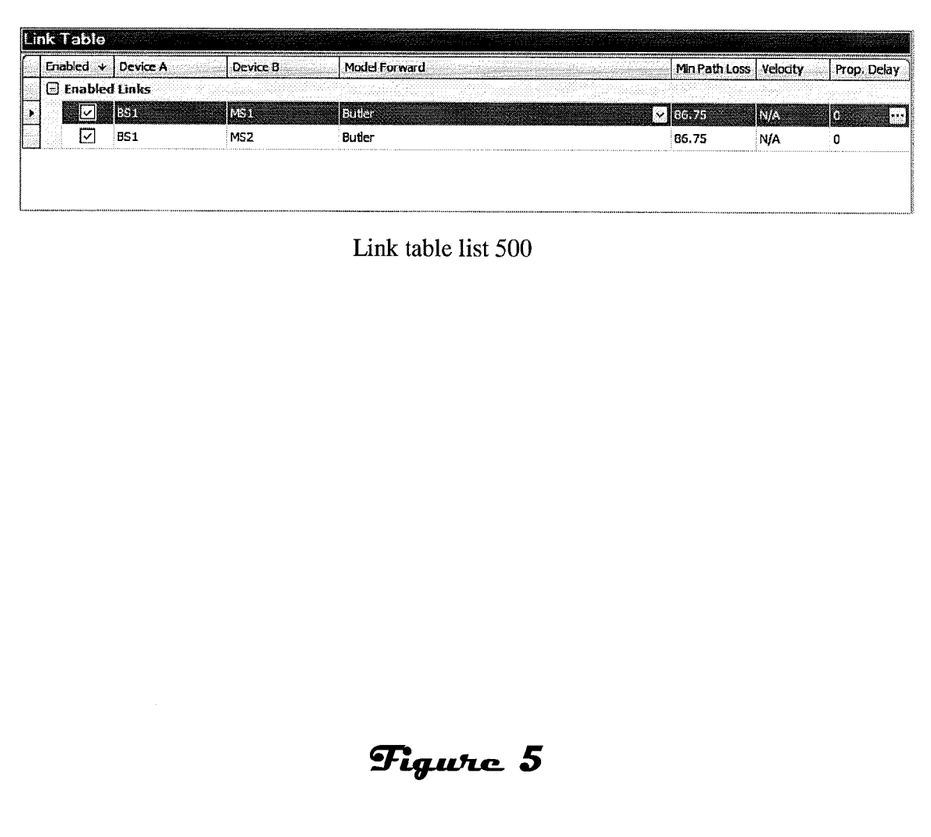
FIG. 5 illustrates a link table associated with the connection topology of FIG. 3.
Figure 6:
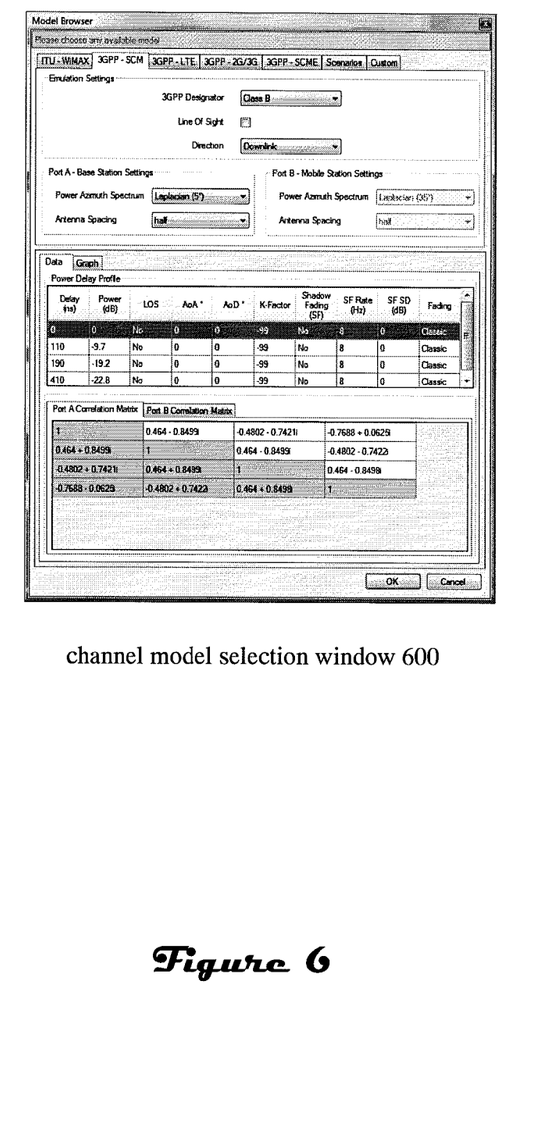
FIG. 6 illustrates a channel model selection window associated with the topology of FIG. 3.

Referring to FIGS. 3, 5 and 6, when the user selects a link 324 via the logical view window (FIG. 3), details for that link are made available in an automatically populated link table list 500 (FIG. 5). The link table list includes each of the configured links, and allows configuration of the properties which characterize those links. Each row in the table represents a link and its properties. A channel model selection window 600 (FIG. 6) allows selection of at least one channel model for the selected link. The channel model defines how the signal is modified on a per-link basis to simulate the effects already described above. Rather than define all of the parameters for a channel model for a link, the user may select from a list of predefined channel models presented via a pull-down menu. Elsewhere, other link parameters such as input power and output power can be selected by the user.

Figure 7:
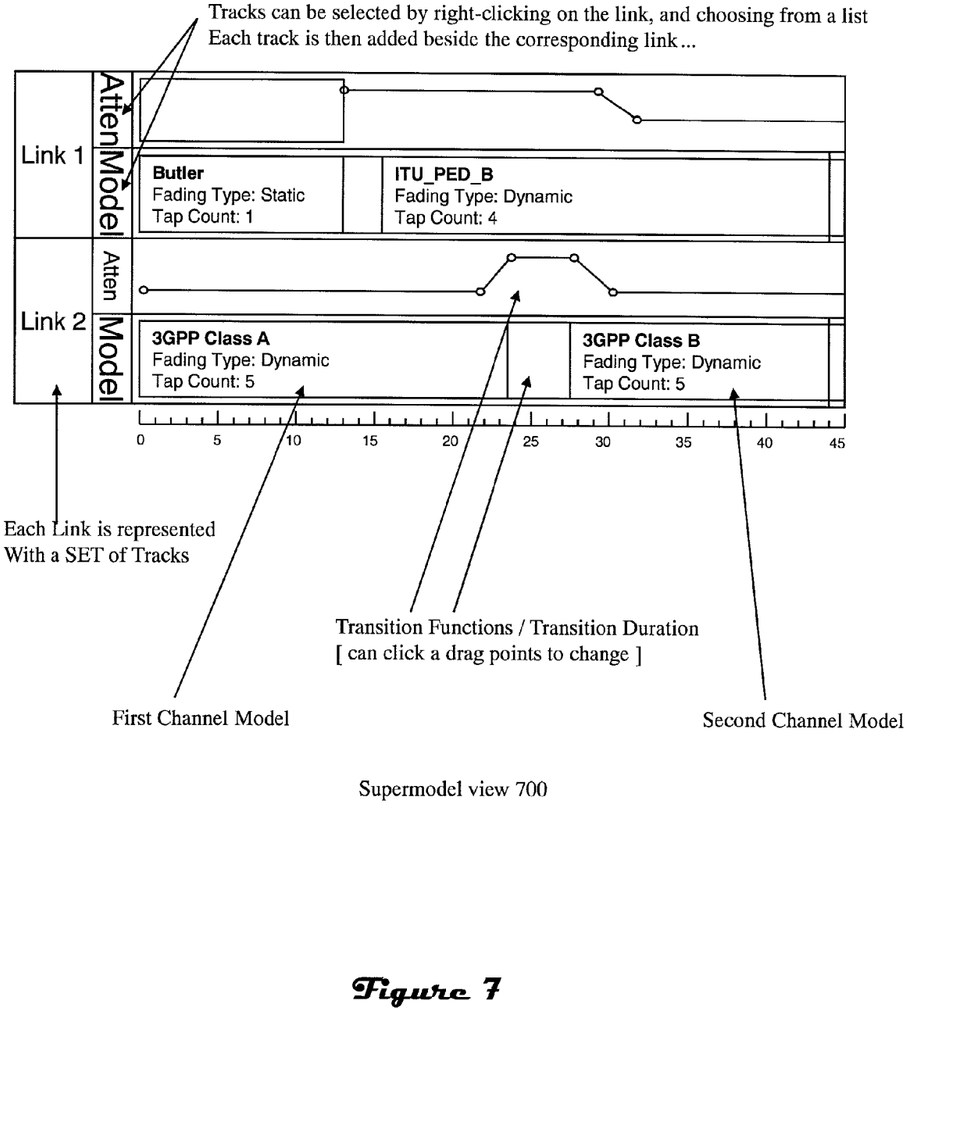
FIG. 7 illustrates a supermodel configuration window.

Referring to FIG. 7, another window presents a supermodel view 700 of the link. The supermodel view allows the user to select different channel models for application to a single link at different periods of time. For example, a first channel model could be used for the link for the first half of a test, and a second channel model could be used for the link for the second half of the test. The supermodel view also allows the user to select a transition function and transition duration. The transition function defines the relative influence of the two models while transitioning from one model to another model. The transition duration defines the period over which the transition takes place. The interface may include a set of predefined transition functions, e.g., instantaneous, linear, or non-linear, from which the user may choose. Further, the interface may accept a user-defined transition function as input, e.g., expressed mathematically.

In addition to enabling changing of the channel model with user-defined transitions, the user may change other parameters outside the channel model such as interference levels. This is presented as an additional 'track' in the interface window. Each individually modified parameter is assigned a new track in the interface window, with each track laying out instances of the parameter (first, second, etc.) and transition parameters.

Once the user provides link-level configuration data, the configuration interface calculates how to allocate path resources in order to support the requested connections. In other words, having been provided with the identification of devices to be tested, links between devices, directionality of the links, channel models for the links, transitions between channel models, and any other appropriate link-level data as input, the configuration interface performs the detailed underlying calculations of how to allocate path resources such as the resource elements (FIG. 2) and RF paths for signals in one or both directions between devices, and also how to physically connect the devices to the simulator. Unlike some prior art simulators which require user input for each path in each direction at various points in time, the illustrated simulator performs per-path calculations for the user so that the user need not enter data below the link level. Further, those calculations which some prior art systems require to be performed offline to produce a pre-recorded test can be performed in real-time during a test, thereby avoiding the delays associated with "playback" type tests. In particular, the simulator calculates configuration settings for each function element while a test is being run. The calculations are produced using a matrix multiply function which operates upon a first matrix representative of function elements in a path (each row representing a path), and a second matrix which represents the applied channel model or models at a given point in time. It should be noted that the model is applied based on the size of the logical representation rather than physical port or relative position in the logical representation.

It should be noted that per-link-basis configuration and control facilitates parallel test configurations. For example, the user can connect multiple pairs of devices, e.g., two base stations and two mobiles stations, to the same simulator and configure them such that they can be tested either independently or collaboratively. This is done by selectively enabling or disabling the set of links between the devices, e.g., using the window depicted in FIG. 3. The per-link-basis concept allows this without having to individually configure each path to achieve this. This allows higher utilization of resources on a single hardware simulator.

While the invention is described through the above exemplary embodiments, it will be understood by those of ordinary skill in the art that modifications and variations may be made without departing from the inventive concepts. Further, while the embodiments are described in connection with various illustrative structures, one skilled in the art will recognize that the system may be embodied in connection with other structures. Accordingly, the invention should not be viewed as limited except by the scope and spirit of the appended claims.

What is claimed is:

1. A method for testing a wireless device in a network environment including multiple wireless devices comprising:
   receiving as input an indication of devices to be connected to a simulator for test, where the simulator connects a first device to a second device via a link that includes multiple paths, and each path includes at least one function element for modifying a signal on the path with which the function element is associated;
   receiving as input an indication of at least one channel model to be applied to an identified link;
   calculating allocation of simulator paths based on the received indication of devices to be connected to the simulator;
   calculating a setting for each function element while a test is running, the setting being calculated based on the at least one channel model;
   configuring the simulator paths according to the calculated allocation;
   configuring each function element with the setting calculated for that function element; and
   modifying a signal transmitted from a first wireless device to a second wireless device with ones of the function elements.

2. The method of claim 1 including receiving as input an indication of links between devices to be connected to a simulator for test, and automatically calculating configuration settings for paths associated with those links.

3. The method of claim 1 further including receiving as input a transition duration which defines a period over which transition from a first channel model to a second channel model for a selected link takes place.

4. The method of claim 3 further including receiving as input a transition function which defines relative influence of the first and second channel models for the period over which transition takes place.

5. The method of claim 1 wherein a supermodel which defines a period over which transition from a first channel model to a second channel model for a selected link takes place and relative influence of the first and second channel models for the period over which transition takes place, and further including a step of executing multiple channel models in series with at least one supermodel defining transition between channel models.

6. The method of claim 1 further including controlling functions that are not associated with the channel model.

7. The method of claim 6 further including a supermodel which defines a period over which transition from a first function to a second function for a selected link takes place and relative influence of the first and second functions for the period over which transition takes place, and further including a step of executing multiple functions in series with at least one supermodel defining transition between functions.

8. The method of claim 1 further including outputting an indication to a user of how the wireless devices are to be connected to simulator ports.

9. The method of claim 1 including generating a graphic representation of logical connection topology.

10. The method of claim 1 including generating a graphic representation of physical connections between devices.

11. The method of claim 10 including causing a label corresponding to a port depicted in the graphical representation to be displayed on a simulator module.

12. Apparatus for testing a wireless device in a network environment including multiple wireless devices comprising:
an interface for receiving as input:
an indication of devices to be connected to a simulator for test, where the simulator connects a first device to a second device via a link that includes multiple paths, and each path includes at least one function element for modifying a signal on the path with which the function element is associated; and
an indication of at least one channel model to be applied to an identified link;
a processor for:
calculating allocation of simulator paths based on the received indication of devices to be connected to the simulator;
calculating a setting for each function element while a test is running, the setting being calculated based on the at least one channel model;
configuring the simulator paths according to the calculated allocation;
configuring each function element with the setting calculated for that function element; and
modifying a signal transmitted from a first wireless device to a second wireless device with ones of the function elements.

13. The apparatus of claim 12 wherein the interface receives as input an indication of links between devices to be connected to a simulator for test, and the processor automatically calculates configuration settings for paths associated with those links.

14. The apparatus of claim 12 wherein the interface receives as input a transition duration which defines a period over which transition from a first channel model to a second channel model for a selected link takes place.

15. The apparatus of claim 14 wherein the interface receives as input a transition function which defines relative influence of the first and second channel models for the period over which transition takes place.

16. The apparatus of claim 12 wherein a supermodel which defines a period over which transition from a first channel model to a second channel model for a selected link takes place and relative influence of the first and second channel models for the period over which transition takes place, and wherein the processor executes multiple channel models in series with at least one supermodel defining transition between channel models.

17. The apparatus of claim 12 wherein the processor controls functions that are not associated with the channel model.

18. The apparatus of claim 17 further including a supermodel which defines a period over which transition from a first function to a second function for a selected link takes place and relative influence of the first and second functions for the period over which transition takes place, and wherein the processor executes multiple functions in series with at least one supermodel defining transition between functions.

19. The apparatus of claim 12 wherein the interface outputs an indication to a user of how the wireless devices are to be connected to simulator ports.

20. The apparatus of claim 12 wherein the interface generates a graphic representation of logical connection topology.

21. The apparatus of claim 12 wherein the interface generates a graphic representation of physical connections between devices.

22. The apparatus of claim 21 wherein the interface causes a label corresponding to a port depicted in the graphical representation to be displayed on a simulator module.

* * * * *